United States Patent [19]

Liebling

[11] 4,272,906
[45] Jun. 16, 1981

[54] CLOSEABLE FISH NET

[76] Inventor: Gary Liebling, Calle 2, R-10 Jardines Fagot, Ponce, P.R. 00731

[21] Appl. No.: 933,290

[22] Filed: Aug. 14, 1978

[51] Int. Cl.³ .............................................. A01K 77/00
[52] U.S. Cl. ........................................ 43/11; 43/134; 43/55; 56/337
[58] Field of Search ................... 43/11, 134, 4, 7, 12, 43/55, 56; 294/19 R, 55; 56/337, 332

[56] References Cited

U.S. PATENT DOCUMENTS

| 213,105 | 3/1879 | Greenwood | 43/134 |
|---|---|---|---|
| 956,803 | 5/1910 | Fromm | 43/12 |
| 1,012,977 | 12/1911 | Bowen | 56/337 |
| 1,133,927 | 3/1915 | Buzard | 56/337 |
| 1,750,163 | 3/1930 | Disney | 43/134 |
| 2,409,146 | 10/1946 | Motel | 43/7 |
| 2,480,924 | 9/1949 | Heger | 43/4 |
| 2,619,755 | 12/1952 | Wenson | 43/12 |
| 2,653,403 | 9/1953 | Oslund | 43/11 |
| 2,818,670 | 1/1958 | Darkenwald | 43/11 |
| 4,000,577 | 1/1977 | Kelley | 43/56 |

FOREIGN PATENT DOCUMENTS

Ad.28348 of 1911 United Kingdom ................ 99/323.5

Primary Examiner—Roscoe V. Parker
Attorney, Agent, or Firm—Posnack, Roberts, Cohen & Spiecens

[57] ABSTRACT

A closeable fish net comprising a frame including a U-shaped portion beneath which a container is suspended and defines with the frame an opening for entry of fish into the container. A cover is slidably supported by the U-shaped portion for movement between a retracted position in which the opening for the fish is open and an extended position in which the opening is closed. An actuator rod is coupled to the cover to move the same between the retracted and extended positions and a finger-engageable portion is provided on the end of the actuator rod.

17 Claims, 4 Drawing Figures

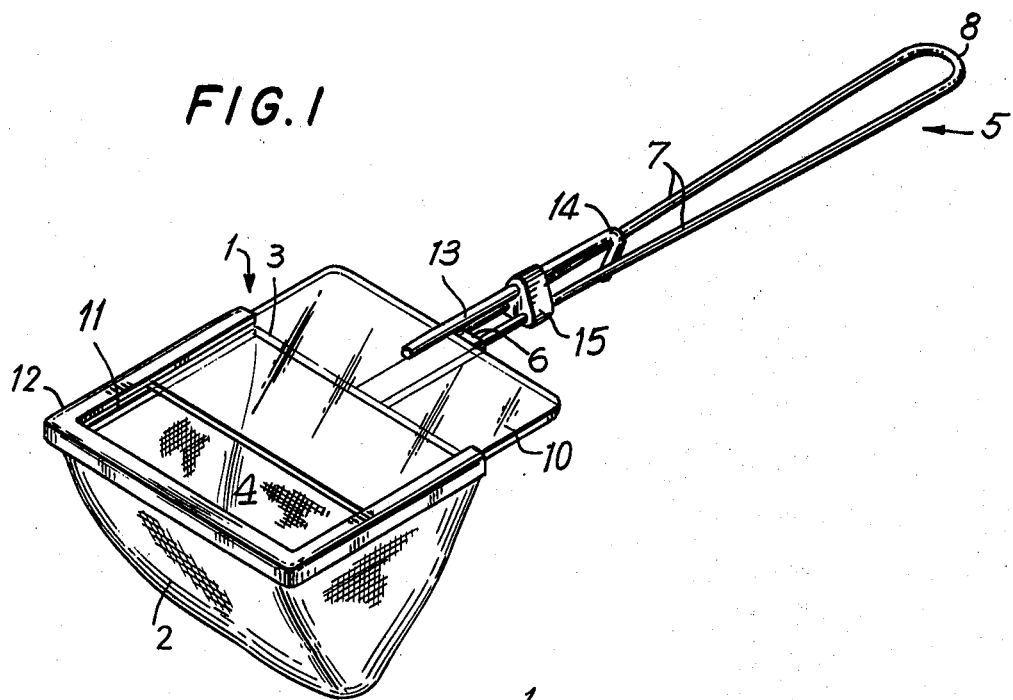
FIG.1
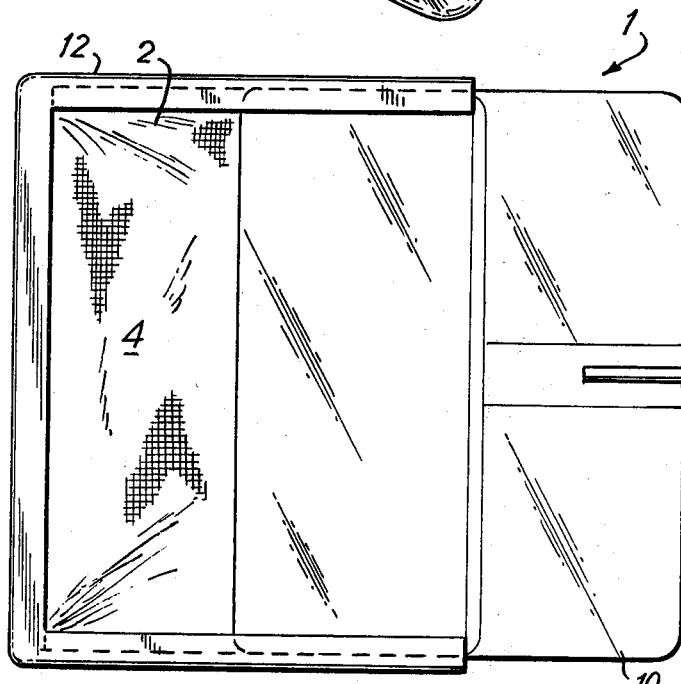
FIG.2
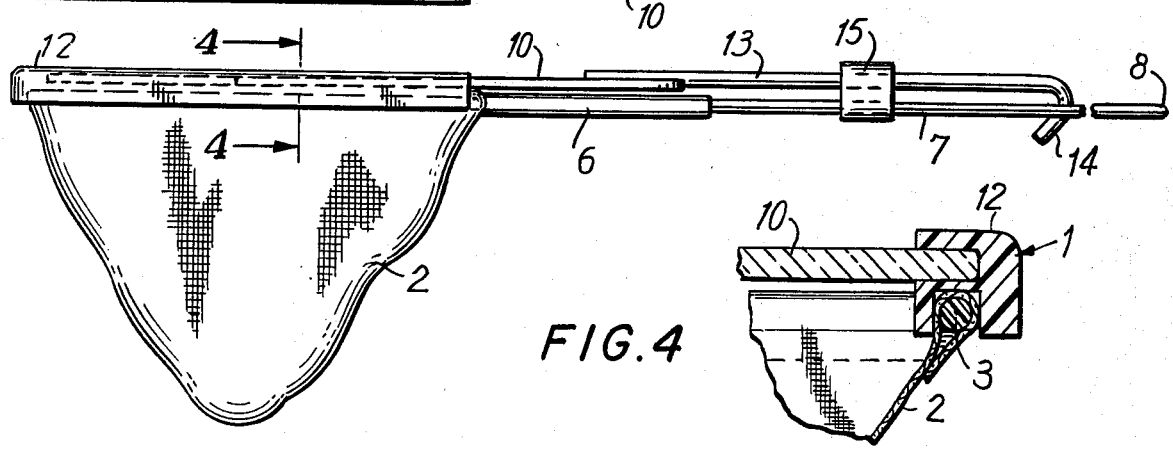
FIG.3
FIG.4

CLOSEABLE FISH NET

FIELD OF THE INVENTION

The invention relates to a closeable fish net of the type having a frame with a container attached to the frame and defining therewith an opening for entry of fish into the container.

PRIOR ART STATEMENT

Fish nets of the above type are well known and indeed the standard fish net consists of a frame with a depending netting which forms a container for the fish.

U.S. Pat. No. 2,619,755 to Henson shows such a net and therein is also shown the provision of a collapsible construction for the net such that the net can be placed within a tubular handle in the collapsed position.

U.S. Pat. No. 2,653,403 to Oslund shows a fish net of the ordinary type in which a netting is suspended from a frame and herein there is employed a means for closing the normally open top of such a fish net to prevent the escape of fish which have been gathered in the net. In this patent, a relatively complex arrangement is employed for closing the bag by gathering it at one side of the frame from which the net is suspended.

U.S. Pat. No. 2,409,146 to Motel shows a shutter for fish nets which is incorporated in the webbing of the net to allow the net to be opened and closed as desired.

U.S. Pat. No. 2,480,924 to Heger discloses a device in which live bait can be trapped and secured by a hand actuation operation so that the bait can be hooked.

U.S. Pat. No. 2,818,670 to Darkenwald discloses a net carrying case with hinged sections adapted to be engaged with one another when the net is collapsed to form a compact closure and when opened to allow the net to be displayed into operative position.

SUMMARY OF THE INVENTION

It is an object of the invention to provide a fish net which can be opened and closed without changing the configuration of the container in which the fish are trapped.

A more particular object of the invention is to provide a fish net of the above construction in which the container for the fish is constituted of net material which undergoes no change in configuration when the net is opened and closed.

A further object of the invention is to provide a fish net which is easily operable with one hand of the user.

Yet another object of the invention is to provide a fish net which is simple to manufacture and is of relatively low cost.

A further object of the invention is to provide a closure arrangement which can be employed with a conventional fish net for opening and closing the net. A further object of the invention is to provide a fish net which will be relatively compact and involve minimal complexity with respect to a conventional fish net.

In accordance with the aforesaid objects, the invention contemplates a fish net which comprises a frame, a container mounted on the frame and defining therewith an opening for entry of fish into the container, and cover means slidably supported by said frame for movement between a retracted position in which said opening is opened and an extended position in which said opening is closed.

In further accordance with the invention there is contemplated the provision of actuator means coupled to said cover means for moving the cover means between the retracted and extended positions.

According to a feature of the invention, the actuator means is manually operable. This can be achieved by providing a finger-engageable portion on the actuator means.

According to a further feature of the invention, the cover means can be transparent.

In accordance with a particular feature of the invention, the frame comprises a U-shaped portion beneath which the container is suspended, said U-shaped portion having grooves therein, said cover means comprising a slidable cover in said grooves.

A handle can extend from the U-shaped portion and an actuator can be connected to the cover and extend proximate the handle.

In a particular construction according to the invention, the handle comprises spaced rod portions and the actuator comprises a rod extending between the rod portions and having a finger-engageable portion on its free end which extends between the rod portions.

BRIEF DESCRIPTION OF THE DRAWINGS

FIG. 1 is a perspective view of a fish net according to the invention.

FIG. 2 is a top plan view of the fish net.

FIG. 3 is a side elevational view of the fish net.

FIG. 4 is a sectional view taken on line 4—4 in FIG. 3.

DETAILED DESCRIPTION

Referring to the drawing, therein is shown a fish net of the hand operated type referred to as a dip net or a landing net in which fish can be trapped. The fish net comprises a frame 1 of solid water-resistant material such as plastic, rubber or the like from which a container 2 is supported in depending fashion. The container is preferably made of conventional mesh or net material. As is conventional the frame comprises a wire or rod 3 to which the upper end of the net 2 is affixed to form an open mouth 4 in which fish may enter the net. A handle 5 is attached to the wire 3 of the frame 1 by a reinforcement plate 6 or the like. The handle 5 is composed of two parallel spaced rods 7 which are connected at their ends by a loop 8.

Up to this point the construction is conventional.

The invention provides a cover 10, which is movable between a retracted position in which the mouth 4 is open and a closed position in which the mouth 4 is closed. When the cover 10 is closed, fish which are trapped in the net will be retained therein and will have no path for escape.

The side edge portions of the cover 10 are slidably engaged in grooves 11 formed in a U-shaped fitting 12 which is mounted on the wire 3 of frame 1. The connection can be made in a number of different ways and it is even possible to form the wire 3 and fitting 12 as an integrated one-piece member. As shown, the member 1 and the wire 3 are separate elements which are secured together by adhesives, heat welding, or the like.

An actuator rod 13 is secured to the cover 10 and a finger-engaging trigger 14 is formed at the end of the actuator rod 13 for displacing the cover between the open and closed positions. The trigger 14 is of curved shape and extends between the spaced rods 7 and the frame 5. Although the trigger 14 is shown of open type, it can be constructed as a closed loop if so desired.

A brace 15 is engaged with the rods 7 of the frame 5 and slidably receives the actuator rod 13 to provide support for the actuator rod.

In use, the cover 10 is withdrawn so that the mouth 4 is open and a fish can be received within the net 2. After the fish has been captured in the net, the cover 10 can be slidably displaced to its closed position by a manual actuation of the trigger 14.

The cover 10 is shown as being a rigid cover of transparent material which will enable looking into the interior of the net 2 with the cover in closed position. By way of example, the cover can be made of plexiglass or other transparent plastic material. As an alternative, the cover can be made of a porous material and can be constituted by a frame which holds mesh or netting material of the same type as that of the container. In such arrangement the frame would be slidably displaceable within the groove of the fitting 12.

As a further modification, the fitting 12 could be constituted by two parallel side wall members without the base of the U and stops could be incorporated into the grooves to limit the closure of the cover. The side wall members could be integrated with the wire 3 of the frame 1.

The fish net of the invention can be employed for small fish such as tropical fish or the like, or for larger fish caught by sportsmen.

In a further modification a biasing spring could be interposed between the actuator rod and the frame to urge the cover to its closed position. Actuation of rod 13 would then be made against the opposition of the spring and upon release of the rod the cover would automatically return to its closed position. In such arrangement, the opening and closure of the fish net can be effected with one hand.

It is also contemplated by the invention that the cover 10, fitting 12 and actuator rod 13 can be made an an assembly which is affixed as such to the unit composed of the frame, container and handle.

Although the invention has been described in conjunction with a single preferred embodiment thereof, it will be apparent to those skilled in the art that numerous modifications and variations can be made within the spirit and scope of the invention as defined by the attached claims.

What is claimed is:

1. A fish net comprising a rigid frame, a container of flexible netting material mounted on said frame and defining therewith an opening for entry of fish into the container, a fitting mounted on said frame around said opening, said frame having a round cross-section, said netting having an edge wrapped around said frame, said fitting being U-shaped in cross-section and mounted over said frame and the netting wrapped thereon, rigid cover means slidably supported by said fitting for movement in a plane between a retracted position and an extended position, said cover means having a dimension corresponding to the size of said opening to close said opening in said extended position, said opening being open and accessible with said cover means in the retracted position and actuator means coupled to said cover means for moving the cover means between the retracted and extended positions.

2. A fish net as claimed in claim 1, wherein said actuator means is manually operable.

3. A fish net as claimed in claim 2 wherein said actuator means comprises a finger-engageable portion.

4. A fish net as claimed in claim 1 wherein said cover means is transparent.

5. A fish net as claimed in claim 1, wherein said fitting is of U-shape and is provided with grooves therein, said cover means comprising a slidable cover in said grooves.

6. A fish net as claimed in claim 5, wherein said frame comprises a handle extending from said frame, said actuator means comprising an actuator connected to said cover and extending proximate said handle.

7. A fish net as claimed in claim 6 wherein said handle comprises two spaced rod portions, said actuator comprising an actuator rod extending between said rod portions and a finger-engaging portion at the free end of said actuator rod extending between said rod portions.

8. A fish net as claimed in claim 7, comprising a brace engaging said rod portions and slidably receiving said actuator rod.

9. A fish net comprising a rigid frame, a container of flexible netting material mounted on said frame and defining therewith an opening for entry of fish into the container, a fitting mounted on said frame around said opening, rigid cover means slidably supported by said fitting for movement in a plane between a retracted position and an extended position, said cover means having a dimension corresponding to the size of said opening to close said opening in said extended position, said opening being open and accessible with said cover means in the retracted position, actuator means coupled to said cover means for moving the cover means between the retracted and extended positions and handle means secured to said frame and extending therefrom, said frame, container and handle means constituting a first assembly, said fitting, cover means and actuator means constituting a second assembly, said second assembly being operatively coupled to said first assembly by connection of said fitting with said frame.

10. A fish net as claimed in claim 9 wherein said fitting is of U-shape and is provided with grooves therein, said cover means comprising a slidable cover in said grooves.

11. A fish net as claimed in claim 10 wherein said actuator means comprises an actuator connected to said cover and extending proximate said handle means.

12. A fish net as claimed in claim 11 wherein said handle means comprises two spaced rod portions, said actuator comprising an actuator rod extending between said rod portions and a finger-engaging portion at the free end of said actuator rod extending between said rod portions.

13. A fish net as claimed in claim 12 comprising a brace engaging said rod portions and slidably receiving said actuator rod.

14. A fish net as claimed in claim 9 wherein said actuator means is manually operable.

15. A fish net as claimed in claim 14 wherein said actuator means comprises a finger-engageable portion.

16. A fish net as claimed in claim 9 wherein said cover means is transparent.

17. A fish net as claimed in claim 19 wherein said frame has a round cross-section, said netting having an edge wrapped around said frame, said fitting being U-shaped in cross-section and mounted over said frame and the netting wrapped thereon.

* * * * *